(12) United States Patent
Sienkiewicz et al.

(10) Patent No.: US 11,343,763 B2
(45) Date of Patent: May 24, 2022

(54) MICRO SLEEP FOR NETWORK NODE PROVIDING SERVICE TO USER EQUIPMENT ONBOARD A HIGH SPEED TRAIN

(71) Applicant: Telefonaktiebolaget LM Ericsson (publ), Stockholm (SE)

(72) Inventors: Esther Sienkiewicz, Ottawa (CA); Joakim Axmon, Limhamn (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 264 days.

(21) Appl. No.: 16/622,332

(22) PCT Filed: Jun. 19, 2017

(86) PCT No.: PCT/EP2017/064955
§ 371 (c)(1),
(2) Date: Dec. 13, 2019

(87) PCT Pub. No.: WO2018/233805
PCT Pub. Date: Dec. 27, 2018

(65) Prior Publication Data
US 2020/0205070 A1  Jun. 25, 2020

(51) Int. Cl.
*H04W 4/00* (2018.01)
*H04W 52/02* (2009.01)
(Continued)

(52) U.S. Cl.
CPC ..... *H04W 52/0206* (2013.01); *B61L 15/0027* (2013.01); *H04W 36/0009* (2018.08); *B61L 2205/02* (2013.01)

(58) Field of Classification Search
CPC ......... H04W 52/0206; H04W 36/0009; H04W 36/165; H04W 84/005; H04W 52/02;
(Continued)

(56) References Cited

U.S. PATENT DOCUMENTS 8,396,609 B2 * 3/2013 Wang .................... H02J 7/0013
429/432
2005/0213541 A1 * 9/2005 Jung .................. H04W 36/0007
370/437
(Continued)

FOREIGN PATENT DOCUMENTS

EP       1401229 A1 * 3/2004  ............ H04W 36/32
EP       1401229 A1    3/2004
(Continued)

*Primary Examiner* — Mahendra R Patel
(74) *Attorney, Agent, or Firm* — Coats & Bennett, PLLC

(57) ABSTRACT

In one aspect, a network node receives a message indicating that UEs that require service are expected to enter a service area of the network node. The network node determines, based on the message, that a change in power management for radio equipment corresponding to the service area is required. The network node determines a timing for initiating the change in power management for the radio equipment, taking into account a predicted time for when the UEs are expected to enter the service area, and triggers the change in power management for the radio equipment, based on the determined timing. In another aspect, the network node predicts a departure time from the first service area for the UEs. The network node then sends to another network node, prior to the predicted departure time, an indication that the UEs are expected to enter a service area of the other network node.

22 Claims, 12 Drawing Sheets

(51) Int. Cl.
*H04W 36/00* (2009.01)
*B61L 15/00* (2006.01)

(58) Field of Classification Search
CPC .. B61L 15/0027; B61L 2205/02; B61L 27/70; B61L 27/14; Y02D 30/70
USPC ............................................................ 370/331
See application file for complete search history.

(56) References Cited

U.S. PATENT DOCUMENTS

| | | | | |
|---|---|---|---|---|
| 2007/0049133 | A1* | 3/2007 | Conroy | G06F 1/30 439/894 |
| 2010/0204861 | A1* | 8/2010 | Kaita | H01M 10/484 320/133 |
| 2011/0194493 | A1* | 8/2011 | Centonza | H04W 52/0235 370/328 |
| 2011/0255577 | A1* | 10/2011 | Agee | H04W 72/042 375/316 |
| 2013/0039230 | A1* | 2/2013 | Lee | H04W 52/0219 370/280 |
| 2015/0208265 | A1* | 7/2015 | Dalsgaard | H04L 5/0035 370/252 |
| 2015/0341874 | A1* | 11/2015 | Nguyen-Dang | H04W 52/0219 370/350 |
| 2016/0353379 | A1* | 12/2016 | Vrzic | H04W 52/0235 |
| 2017/0011300 | A1* | 1/2017 | Munetsugu | G06N 5/04 |
| 2017/0033834 | A1* | 2/2017 | Gross | H04L 67/2804 |
| 2017/0280314 | A1* | 9/2017 | Yang | H04L 1/04 |

FOREIGN PATENT DOCUMENTS

| | | | | | |
|---|---|---|---|---|---|
| EP | 2879444 | A1 * | 6/2015 | ........ | H04W 52/0206 |
| JP | 2016225968 | A * | 12/2016 | ............. | G06N 5/04 |
| WO | 2011085238 | A2 | 7/2011 | | |
| WO | WO-2011085238 | A2 * | 7/2011 | ........... | H04L 5/0048 |
| WO | 2012162353 | A1 | 11/2012 | | |
| WO | WO-2012162353 | A1 * | 11/2012 | ........ | H04W 36/0011 |
| WO | WO-2017191919 | A1 * | 11/2017 | ........ | H04W 36/0011 |

* cited by examiner

800

```
┌─────────────────────────────────────┐
│ RECEIVE A MESSAGE INDICATING THAT A PLURALITY OF │
│ UES REQUIRING SERVICE FROM THE WIRELESS │
│ COMMUNICATIONS SYSTEM ARE EXPECTED TO ENTER │
│ A FIRST SERVICE AREA, THE FIRST SERVICE AREA │
│ BEING ASSOCIATED WITH THE NETWORK NODE │
│ 802 │
└─────────────────────────────────────┘
                    ↓
┌─────────────────────────────────────┐
│ DETERMINE, BASED ON THE MESSAGE, THAT A CHANGE │
│ IN POWER MANAGEMENT FOR RADIO EQUIPMENT │
│ CORRESPONDING TO THE FIRST SERVICE AREA IS │
│ REQUIRED │
│ 804 │
└─────────────────────────────────────┘
                    ↓
┌─────────────────────────────────────┐
│ DETERMINE A TIMING FOR INITIATING THE CHANGE IN │
│ POWER MANAGEMENT FOR THE RADIO EQUIPMENT, │
│ TAKING INTO ACCOUNT A PREDICTED TIME FOR WHEN │
│ THE PLURALITY OF UES ARE EXPECTED TO ENTER THE │
│ FIRST SERVICE AREA │
│ 806 │
└─────────────────────────────────────┘
                    ↓
┌─────────────────────────────────────┐
│ TRIGGER THE CHANGE IN POWER MANAGEMENT FOR │
│ THE RADIO EQUIPMENT, BASED ON THE DETERMINED │
│ TIMING │
│ 808 │
└─────────────────────────────────────┘
```

*FIG. 8*

MICRO SLEEP FOR NETWORK NODE PROVIDING SERVICE TO USER EQUIPMENT ONBOARD A HIGH SPEED TRAIN

TECHNICAL FIELD

The present invention generally relates to wireless communication networks, and particularly relates to reducing power consumption of network nodes that provide radio network access for devices on high speed trains (HST).

BACKGROUND

In the design of wireless communication networks there is an ongoing effort to reduce radio unit power consumption, as power consumption constitutes a dominating part of a network operator's operational expenditure. Various power saving schemes have been introduced to reduce the power that is used during times when only low communication capacity is needed, such as in residential areas at night.

There has also been an effort to improve radio network access for devices traveling on high speed trains (HST). HST involves linear network deployment along the railway tracks, as shown in FIG. 1. The same kind of network deployment is being evaluated as part of the development of fifth-generation, or "5G" wireless networks, with this evaluation effort being referred to as 5G HST.

Railroads often pass through remote areas where there is little or no demand on communication capacity except when a train is passing. Due to the potentially high speeds of the trains, many of the power saving schemes deployed in conventional wireless networks are deemed too slow to be used along railroads, or would require large activation and deactivation time margins, which would result in losing many of the power saving opportunities. As a consequence, power saving features are seldom used along railroad tracks, even though the necessary technologies to support for these schemes may have already been implemented in the base stations.

SUMMARY

In order to fully benefit from power saving opportunities, a power saving scheme needs to be capable of handling batches of user equipments (UEs) that enter and leave a coverage area at high speed. The embodiments described herein provide a solution that facilitates dynamic selection or adaptation of power saving schemes in certain scenarios, such as for network coverage along high speed train (HST) lines. Since the cost associated with power consumption constitutes a significant part of the operational expenditures for many wireless networks, the solution allows operators to benefit from cost reductions. Moreover, the solution helps to reduce the overheating of base stations as more time is spent in sleep mode. Another advantage includes improved opportunities for "green" certifications, such as Leadership in Energy and Environmental Design (LEED) certification of the networks.

According to some embodiments, a method, in a first network node of a wireless communications system, includes receiving a message indicating that a plurality of UEs require service from the wireless communications system are expected to enter a first service area, the first service area being associated with the first network node. The method includes determining, based on said message, that a change in power management for radio equipment corresponding to the first service area is required. The method also includes determining a timing for initiating the change in power management for the radio equipment, taking into account a predicted time for when the plurality of UEs are expected to enter the first service area, and triggering the change in power management for the radio equipment, based on the determined timing.

According to some embodiments, a method in a first network node of a wireless communications system includes predicting a departure time from a first service area for a plurality of UEs. The method then includes sending to a second network node, prior to the predicted departure time, an indication that a plurality of UEs requiring service from the wireless communications system are expected to enter a second service area, the second service area being associated with the second network node.

According to some embodiments, a network node in a radio access network includes communication circuitry configured for communicating with other network nodes, radio equipment configured for communicating with UEs in a first service area of the first network node and processing circuitry operatively associated with the communication circuitry and radio equipment. The processing circuitry is configured to receive a message indicating that a plurality of UEs require service from the wireless communications system are expected to enter a first service area, the first service area being associated with the network node. The processing circuitry is configured to determine, based on said message, that a change in power management for radio equipment corresponding to the first service area is required. The processing circuitry is also configured to determine a timing for initiating the change in power management for the radio equipment, taking into account a predicted time for when the plurality of UEs are expected to enter the first service area, and trigger the change in power management for the radio equipment, based on the determined timing.

According to some embodiments, a network node in a radio access network includes communication circuitry configured for communicating with other network nodes, radio equipment configured for communicating with UEs in a first service area of the first network node and processing circuitry operatively associated with the communication circuitry and radio equipment. The processing circuitry is configured to predict a departure time from a first service area for a plurality of UEs and send to a second network node, prior to the predicted departure time, an indication that a plurality of UEs requiring service from the wireless communications system are expected to enter a second service area. The second service area is associated with the second network node.

Some embodiments of the present invention involve mobility detection, operation mode control and scheduling by a network node. Mobility detection by the network node keeps track of incoming and outgoing UEs in the coverage area or segments thereof, and the associated capacity needed. The required capacity is used by the operation mode control of the network node to determine which power saving scheme to use, if less than full capacity is needed. For instance, when a train enters or leaves a coverage area, the required capacity may change, thus providing an opportunity for power savings by using a dynamic operation mode selection. The network node's scheduling takes the power saving scheme into account in the scheduling of UEs. The predictable path of a train can be helpful in designing and scheduling energy saving features. Additionally, mobility detection may include exchanging parameters related to radio propagation, such as a currently used pre-coding matrix indicator (PMI) in the source cell, thereby helping the next remote radio unit (RRU) to have a good indication of a channel state of the incoming UEs.

The methods may also be implemented by apparatus, devices, computer readable medium, computer program products and functional implementations.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 8 illustrates a corresponding method in the network node, according to some embodiments.

DETAILED DESCRIPTION

The embodiments of the present invention described herein provide a solution that facilitates dynamic selection or adaptation of power saving schemes in certain scenarios, such as for network coverage along high speed train (HST) lines.

Several sleep mode features have previously been designed and implemented for base stations. These features and others can be selected or adapted according to various embodiments of the techniques detailed herein. A first sleep mode feature is referred to as "Micro Sleep Tx." This feature exploits the fact that Long Term Evolution (LTE) operation does not require any continuous system information or signals. This feature can also be used for applications such as machine type communication (MTC)/enhanced MTC (eMTC) or narrowband internet of things (NB-IoT), where the traffic is expected to be more bursty than a connected call. During the no transmission times, the power amplifier (PA) output power can be set to zero, and the radio unit (RU) activates RU Symbol Based Power Save (SBPS), which is described below. This enables the "off state" of the gate bias of the power amplifier, which lowers energy consumption of the overall RU.

Another sleep mode feature is referred to as "MIMO Sleep Mode." This feature provides energy savings by (1) switching off whole radio unit (RU) transmitter chains, (2) switching off the PA gate bias (using SBPS), or (3) changing drain bias and operation point of the PA. When there is a period of time when the RU does not transmit for some time, it is possible to save energy by toggling the gate bias. There is also the option to switch off the whole RU transmitter chain. This provides a larger energy savings, but can only be applied when traffic is low enough that only one carrier is configured on a PA. This would work best during extreme "off hours," such as night time or when trains are not traveling.

A feature referred to as "Symbol Based Power Save (SBPS)" reduces the gate bias of the PA to place the PA in a standby state. To make this change, the rise time using the fastest hardware can be anywhere from 8 to 16 microseconds. The main purpose of reducing the gate bias (with drain bias untouched) is to help reduce the number of OFDM symbols per radio frame such that a PA can sleep.

Figure 1:
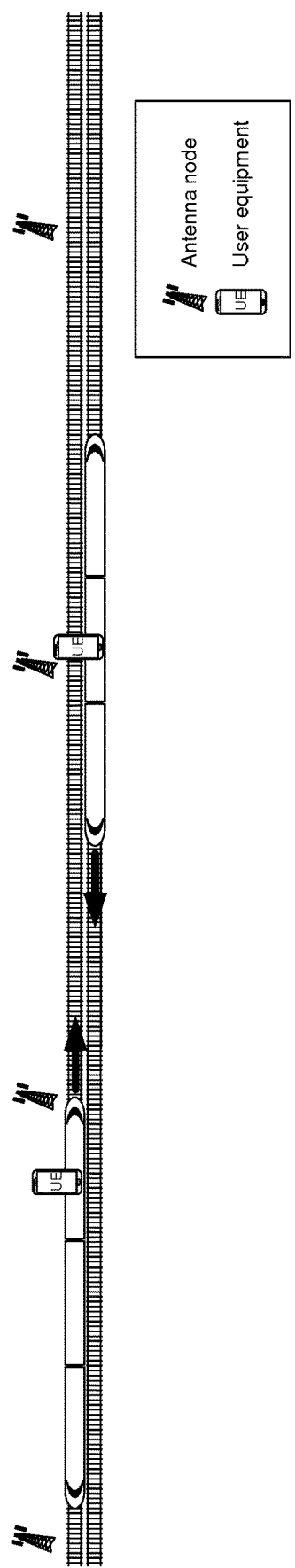
FIG. 1 is a diagram illustrating linear network deployment, such as along a high-speed train line.
Figure 2:
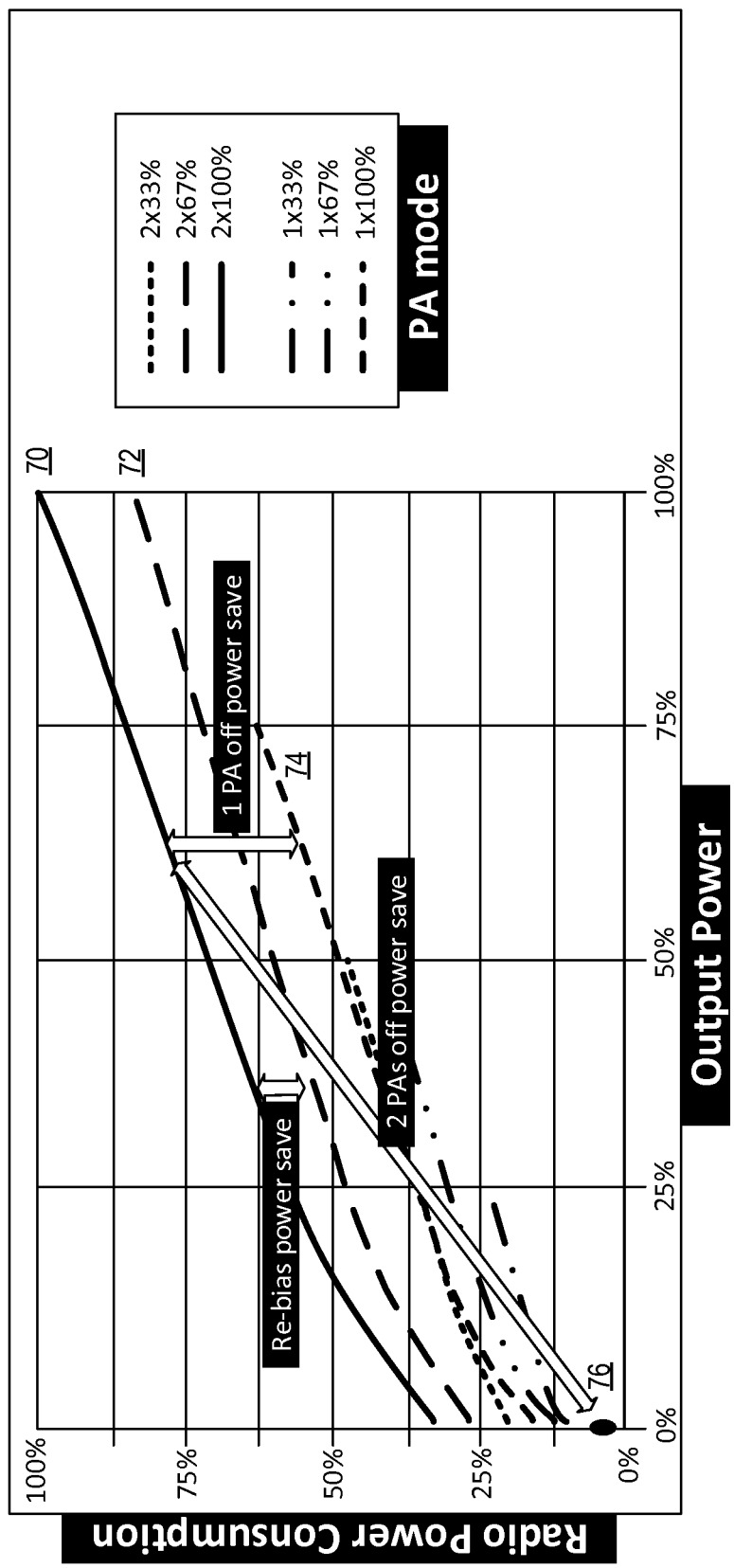
FIG. 2 is a graph showing typical power consumption for antenna ports under different power saving schemes.

FIG. 2 is a graph illustrating typical power consumption for a 2-antenna port remote radio unit (RRU) under different power saving schemes. This typical power line is shown by line 70. This figure also illustrates the relative amount of power that can be saved from using PA re-biasing and PA off (power saving) features on a typical 2-antenna port RRU.

The above sleep modes may be utilized to enable the solution proposed in the embodiments described herein. By re-biasing or turning off the PA, the amount of power consumed is reduced. This lower power is shown by line 72 in FIG. 2. The amount of time it takes to re-bias the PA (i.e., wake it up from sleep mode or turn it down to sleep mode) is known. A PA should take at most 15 seconds for re-biasing to be completed. Any configuration that can utilize power savings will involve the PA in sleep mode or a reduced capacity of more than 30 seconds. This would enable savings compared to legacy base stations.

As for the power savings from turning Pas off, line 74 shows the power saved by turning one PA off. Line or dot 76 shows the power that is saved by turning two PAs off.

When a train moves out of a cell that is used in a composition of a super cell, that cell can reduce its supported capacity and thereby save power according to any of the existing power saving methods. This also applies for scenarios where a cell consists of several adjacent coverage segments, each served, for example, by a remote radio head (RRH), and where the UEs travel through the coverage segments according to predetermined patterns.

Before a train enters a new cell that is used in a composition of a super cell (i.e., a group of cells that share the same cell identity although managed by different base stations), that cell changes its supported capacity to the foreseen needed capacity, according to various embodiments. Change of capacity may be synonymous to a change in the applied power saving operation mode. This also applies for scenarios where a cell consists of several coverage segments.

One challenge is that while a change in power saving operation mode can be carried out in short time, as long as it is towards a capacity reduction, the reverse may take a significantly longer time, depending on how deep a sleep the cell has been. Hence, with trains traveling at speeds of 500 km/h or even higher, mechanisms other than those available in prior art are needed in order to fully benefit from power saving opportunities. Particularly, each base station has to get an indication on which capacity is needed, and when, in order for it to be able to increase the capacity before the batch of UEs, carried by the train, enters the coverage area. For instance, a remote radio unit (RRU) in partial or full sleep may require up to 15 seconds to change to a power saving operation mode that provides a higher capacity than current capacity.

Providing such an indication to each base station may be handled by a central mobility detection unit comprised in a network node, in some embodiments. In others, such indications may be provided by neighboring base stations in a cooperative manner, e.g., with proprietary signaling over the X2 interface using, for example, the mobility container. The latter approach may also include an exchange of parameters related to radio propagation such as currently used PMI in the source cell, such that with prior art mapping methods, the more suitable precoding to use in the target cell can be predicted. This is particularly attractive when the cells are part of a super cell structure, and the UE ideally can transfer from one cell to another seamlessly despite being served by different base stations.

An indication of the time at which the capacity is needed may be essential, in some cases, as this allows for longer sleep time and hence larger savings when taking full advantage of this feature. The minimum distance between any two trains travelling on the same track is governed by regulatory safety headways, i.e., minimum distance or time between any two vehicles in a mass transit system. The exact amount varies between countries, in remote or urban areas, and/or even time of day (e.g., rush hour versus night time). As a rule of thumb, safety headway for freight trains are measured in part of an hour, while metro systems operate with headways on the order of a few minutes or more. With a proper indication on at which instant a certain capacity is needed, the target cell may remain in a lower power saving operation mode a longer time before taking measures to increase the supported capacity.

The time at which the train will enter the target cell may be predicted from: an estimated speed of the trains as determined from the batch of UEs, an estimated distance to the cell border and/or a current time (as provided, e.g., via Global Navigation Satellite System (GNSS)).

In some embodiments, the location of the cell border may be determined automatically, using statistical approaches. For example, a system might initially apply conservative estimates (maybe with large margins) of when the UEs will come into coverage of the target cell. As statistical information regarding transitions from one cell to another becomes more precise over time, an increasingly aggressive estimate (in the sense of smaller margins) can be applied, thus allowing longer time in power saving operation for the target cell. Additionally, this information can be provided to the network operator and be utilized for cell coverage upgrades or changes. For example, along this predicted path it may be such that certain RET (remote electronic tilt) can be adjusted to further optimize the main beam for better coverage.

It should be noted that while the techniques described herein are introduced, in the discussion above, in the context of high-speed train, the techniques described herein are not limited to this context. These techniques might also be applied along highways, for example, where paths of fast moving groups of UEs can be predicted and used as a basis for the indications described herein. In these environments, there may not be a known schedule, but many embodiments of the techniques do not rely on knowledge of any particular schedule.

Discussed below are techniques that allow sleep modes to be selectively enabled and/or disabled based on the receipt of indications that several UEs are about to enter or leave a cell. Examples of sleep modes that may be selectively enabled and/or disabled according to these approaches include full sleep, partial sleep and full operation. For full sleep, the PA is completely turned off and it might take 15 seconds to prepare for operation again. While in full sleep, the PA uses a minimum of power (see PA off in FIG. 2). For partial sleep, the PA is in standby and full operation can be achieved within 8-16 us. While in partial sleep, only a limited power saving is achieved (see PA re-biasing in FIG. 2). For full operation, the PA is in full operation the whole time. No power is saved.

According to several embodiments of the presently disclosed techniques, a network node receives an indication on inbound UEs, with needed capacity at a predicted point in time, and determines the total capacity needed at the predicted point in time (existing traffic plus inbound traffic). Note that this indication may come from a neighboring network node or from a network node further down a chain of network nodes, for example. In some embodiments, this indication may come from a central control node, or a node that is otherwise responsible for handling such indications for multiple network nodes. The network node determines the power saving operation mode needed at the predicted point in time, based on the needed capacity and the capacity provided by each of the power saving feature alternatives. The network node then configures the radio equipment (e.g., RRU circuitry) to achieve the determined power saving operation mode at the predicted point in time, taking into account the time needed to go from a first operational mode to a second operational mode, where the time may depend on the first and the second operational modes. The network node predicts the point in time at which the UEs will enter a neighboring cell, which neighboring cell, and the needed capacity for the UEs. The network node then sends an indication either directly to the neighboring cell, or to a centrally located network node containing a mobility detection unit. When the batch of UEs has left the cell, the network node determines the needed capacity for remaining UEs. The network node configures the radio equipment to achieve the determined power saving operation mode as soon as the batch of UEs have left the cell.

Figure 3:
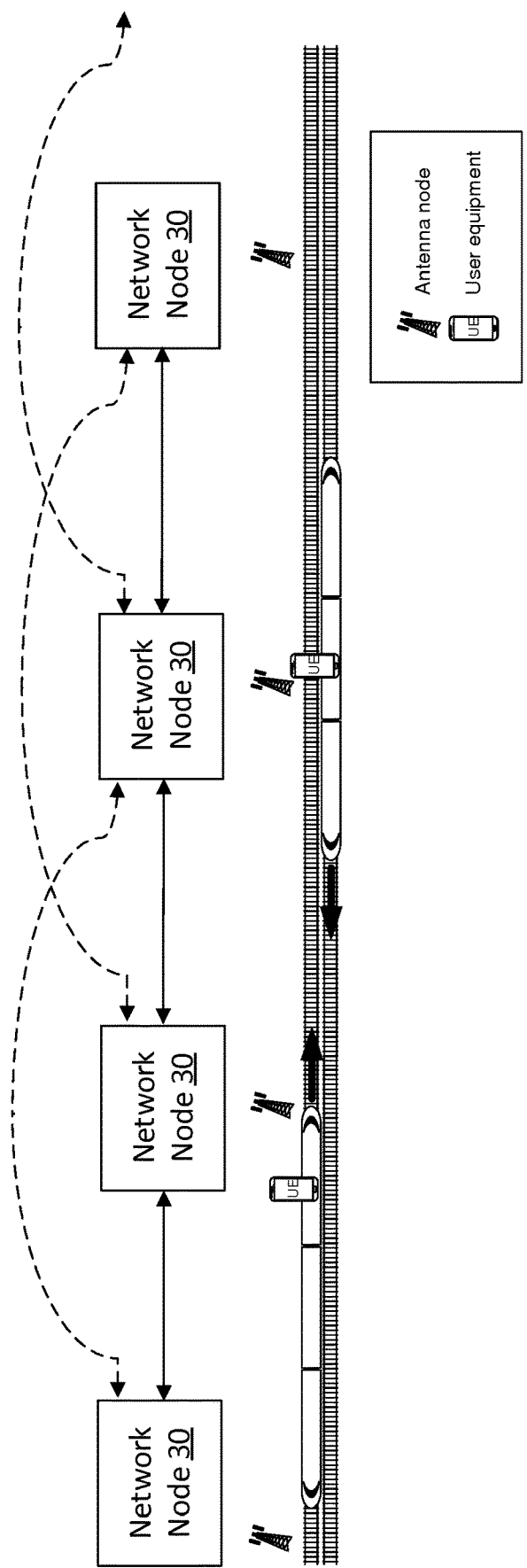
FIG. 3 illustrates communication between several radio network nodes, according to embodiments of the present invention.

It should be appreciated that corresponding embodiments of the invention include network nodes that transmit, to one or more other network nodes, indications regarding UEs that are outbound from the transmitting network node and that are expected to enter into the coverage of the receiving network node. As seen in FIG. 3, a network node may perform both roles, i.e., both receiving indications regarding incoming UEs, and sending indications regarding outgoing UEs. Note also that, as shown by the dotted lines in FIG. 3, these indications are not necessarily sent to or received from immediately adjacent network nodes, but may instead be sent to and/or received from a network node or nodes further up or down the path. Further, while FIG. 3 shows a separate network node 30 for each of the antenna nodes, there is not necessarily a one-to-one correspondence. In some cases, the network node 30 is part of or closely associated with an eNB, which in turn may control one or several transmitting antennas, or remote radio heads (RRHs), for example. In some cases, a single network node 30 may be responsible for managing incoming and outgoing indications for two or more base stations or other access points.

Figure 4A:
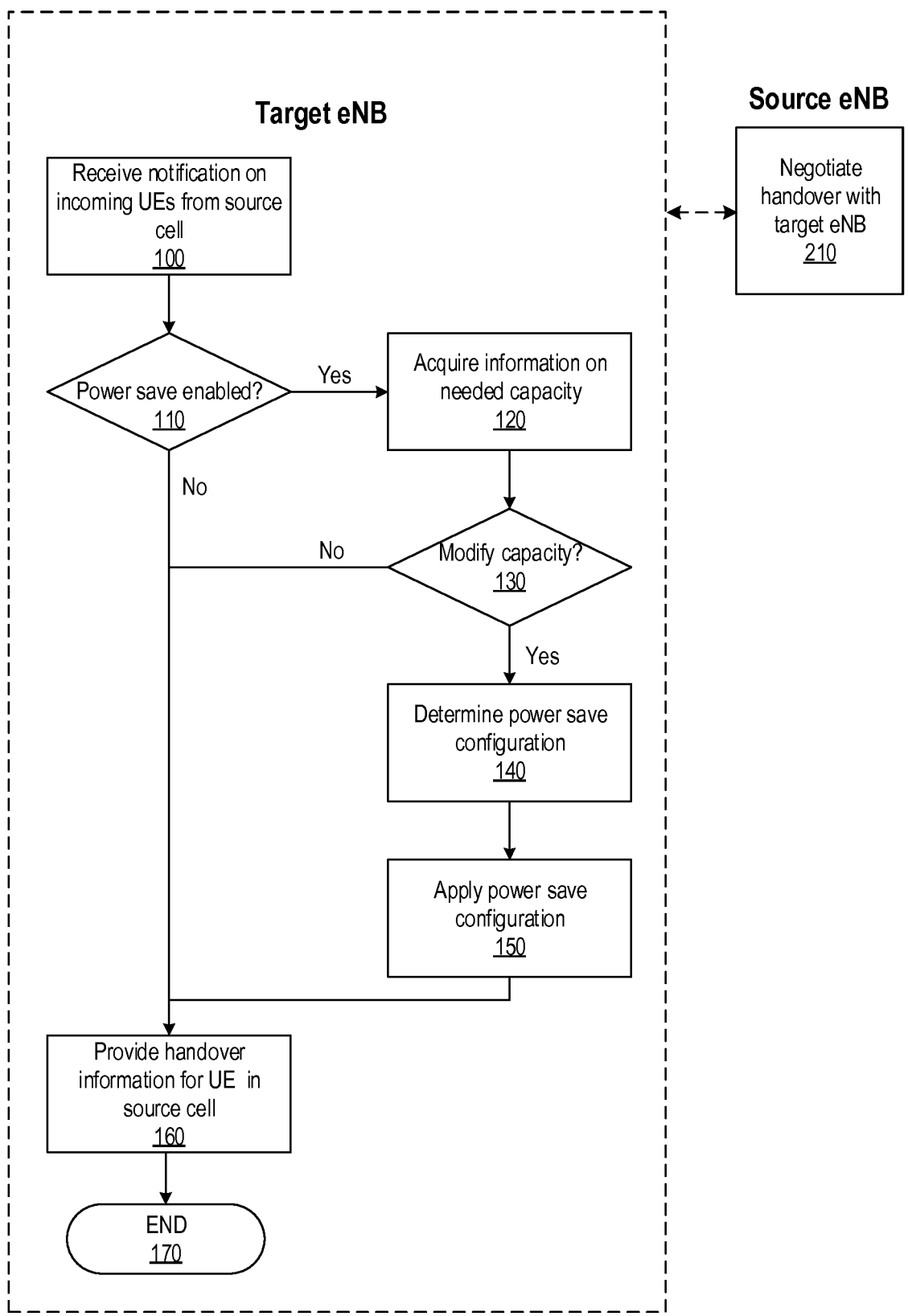
FIGS. 4A-4B illustrate a flowchart for a power saving method, according to some embodiments.

FIG. 4A is a flowchart illustrating an embodiment of the invention from the perspective of a target eNB, which is an example of a network node 30 as shown in FIG. 3. The target eNB receives a notification that UEs are approaching the coverage area (block 100). Again, this indication may come from a neighboring network node, e.g., a neighboring eNB, or from a network node further down a chain of network nodes, for example. In some embodiments, this indication may come from a central control node, or a node that is otherwise responsible for handling such indications for multiple network nodes. In some embodiments, depending on which eNB is the source eNB, the target eNB may know from which direction the UE will enter the coverage area. The notification may be received well in advance, in some cases, since the UEs are travelling along a set path. Block 210 signifies coordination with the source eNB.

If the target eNB is employing a power saving scheme (block 110: YES), it determines which capacity will be needed when the UE(s) enter the coverage area (block 120). When predicting the capacity needed, the eNB may take into account UEs that are entering as well as UEs that are leaving the coverage area, or that are predicted to have left when the UEs upon which the target eNB has been notified enter the cell.

After having predicted the capacity that will be needed when the UEs enter the cell, the target eNB determines whether the capacity provided under the current power saving scheme will be enough, or whether the capacity will have to be modified. If so (block 130: YES), the target eNB determines a suitable power saving configuration that meets the forecasted capacity need. This could, for instance, mean going from full sleep mode to selective power saving, or going to full capacity. The eNB may have lookup-tables of the capacity provided under different power saving schemes to which it can compare the forecasted capacity need in order to determine a suitable power saving configuration. After having determined a power saving configuration (including the case where the cell is at full capacity) (block 140), the target eNB applies the power saving configuration, i.e., reconfigures the RRU(s) (block 150).

The target eNB prepares mobility control information for the incoming UE(s), and sends this to the source eNB for inclusion in the handover command (RRC connection reconfiguration) (block 160). When preparing the mobility control information, the target eNB may take into account information related to the power saving mode. This may include for instance providing multicast-broadcast single-frequency network (MBSFN) patterns to indicate subframes that will be muted and hence not used for communication. The flowchart stops at end point 170, although, of course, the procedure may be repeated when another indication is received.

Figure 4B:
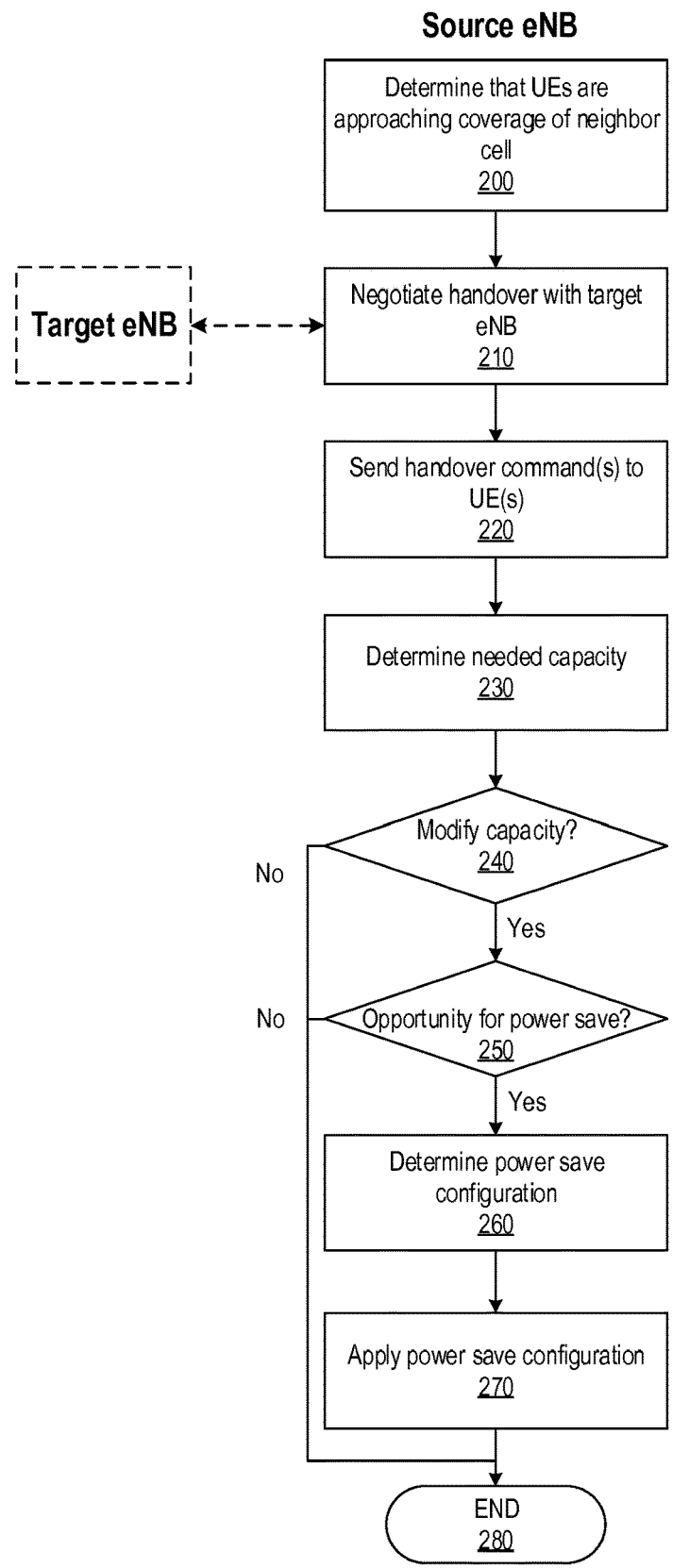

FIG. 4B is a flowchart illustrating an example method from the perspective of the source eNB, which is another example of the network node 30 shown in FIG. 3. The source eNB determines that a UE is heading towards the coverage area of the target cell, of which there may be several (block 200). The target cell may be an immediate neighbor of a cell provided by the source eNB, in some embodiments, or may be a cell further away, in others. In some embodiments, the source eNB starts handover negotiations with the target eNB, and provides information such as the average throughput used by the UE. It may further provide a prediction on at which point in time the UE is to be handed over (block 210). After the negotiations, the source eNB receives mobility control information from the target eNB, which it includes in the RRC connection reconfiguration message sent to the UE. When the UE is about to enter coverage of the target cell, the source eNB sends a handover command to the UE (RRC connection reconfiguration) (block 220).

After the UE has been handed over, the source eNB assesses how much capacity is needed in the cell (block 230). In the case where the eNB finds that the capacity can be reduced (block 240: YES), it checks whether there is an opportunity to save power. Particularly, the eNB may be aware of future incoming UEs that will increase the needed capacity, and if the time until higher capacity is needed again is too short for a transition to a power saving scheme providing lower capacity and then a transition to a power saving scheme that allows higher capacity, the eNB may find that there is no opportunity to save power (block 250: NO). Otherwise (block 250: YES), it may determine the suitable power saving configuration (block 260) and configure the RRU(s) accordingly (block 270). The flowchart stops at endpoint 280.

In future networks, increasingly higher frequencies, e.g., millimeter-wave (mmWave) frequencies, are likely to see increased use. Because attenuation increases with higher frequencies, one can anticipate denser deployment when the mmWave range is used. One possible consequence of this is that it may be desirable, in some embodiments, for the source node to send the indication regarding outbound UEs to multiple nodes, or to a node further away, i.e., not the immediate neighbor but the neighbor's neighbor, etc., since a train in these scenarios may change cell more frequently than when lower carrier frequencies are used, and hence stay a shorter time in each cell. In such cases, the time a train stays in a neighboring "source cell" may be shorter than the warm-up time required in the "target cell" to which the train is heading, thus necessitating earlier warnings than can be provided to the nearest neighbor.

Accordingly, in some embodiments, if the expected time the train will stay in a neighbor cell is shorter than the largest warmup-time needed in the target cell, then notifications must be sent earlier, i.e., from the neighbor's neighbor cell. With a centralized node, to which cell the notification is forwarded could also depend on the state of each cell, e.g., whether the cell is in deep sleep or lighter sleep, since the wake-up time varies depending on the cell's operational state.

Figure 5:
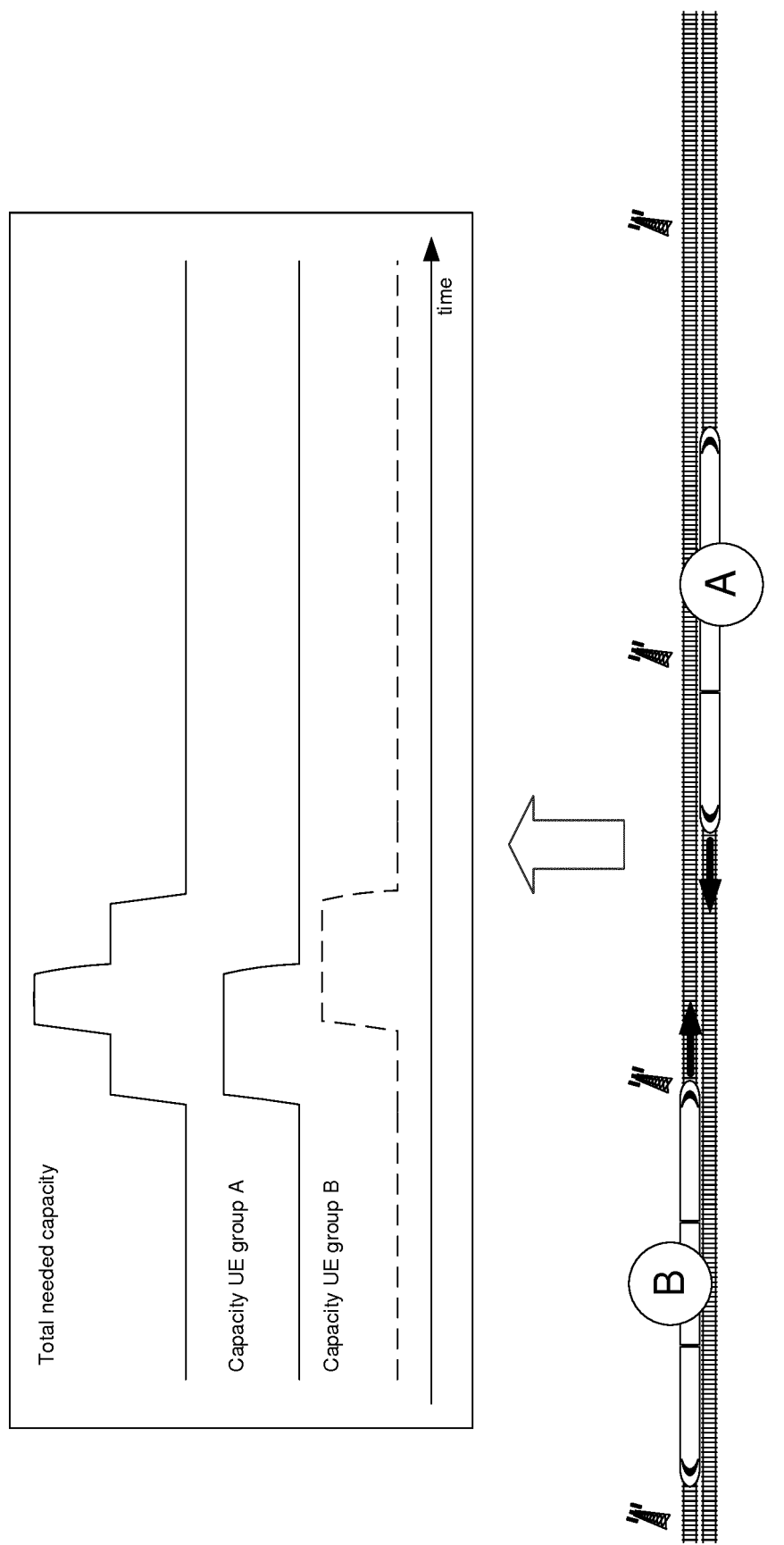
FIG. 5 is a diagram illustrating the capacity that is needed over a period of time.
Figure 6:
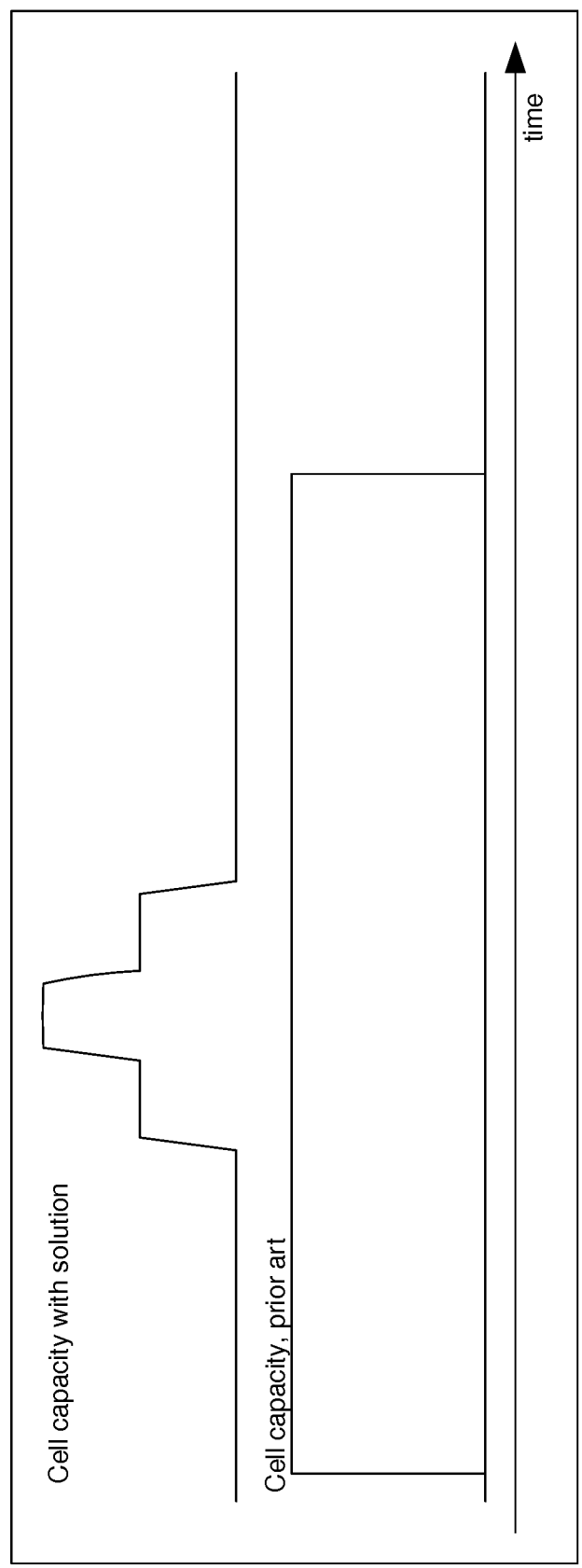
FIG. 6 is a diagram illustrating cell capacity that is provided according to some embodiments.

Note that one eNB may simultaneously be the target eNB and the source eNB. Particularly, it is in the role of target eNB that the eNB increases capacity, if needed. It is in the role as source eNB that it decreases capacity, if suitable. The dynamic switching of supported cell capacity via different power saving functions is illustrated in FIG. 5 and FIG. 6. FIG. 5 is a graph of an example of capacity that is needed over time. FIG. 6 is a graph of cell capacity that is provided according to an embodiment.

Figure 7:
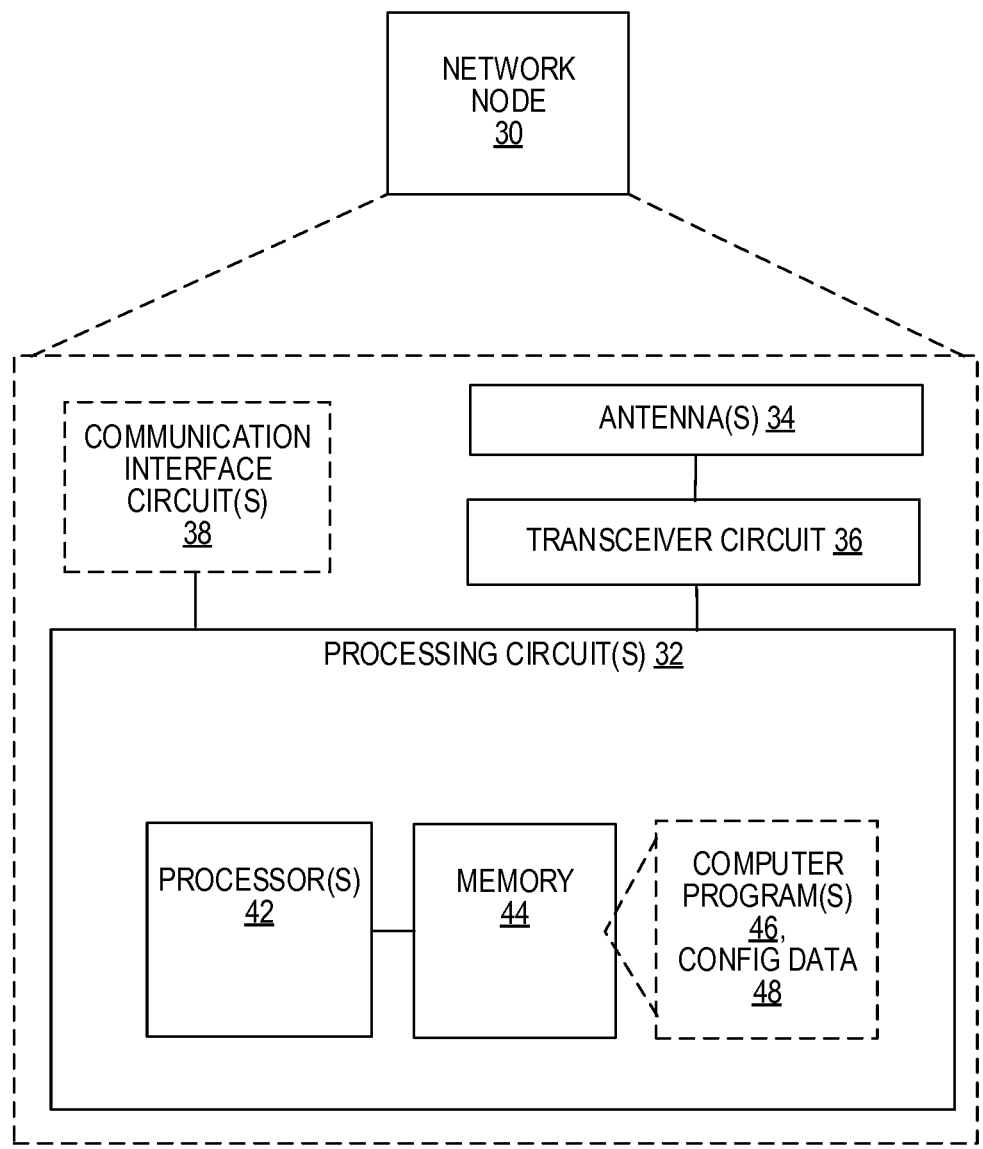
FIG. 7 is a block diagram of a network node configured to perform a power saving method, according to some embodiments.
Figure 9:
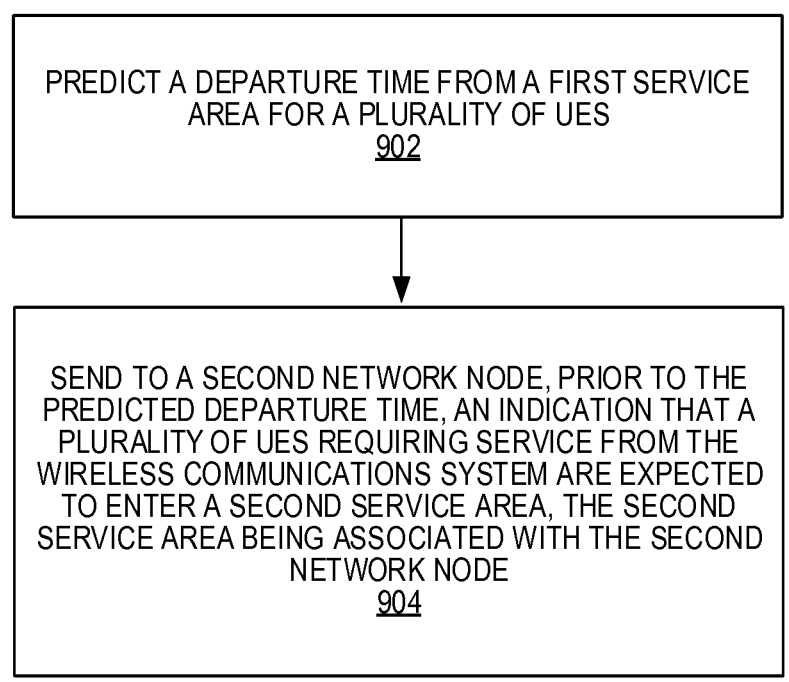
FIG. 9 illustrates another method in a network node, according to some embodiments.

FIG. 7 is a block diagram illustrating a network node 30 that may be configured to perform the role of target eNB or source eNB. In this example, the network node 30 may be a radio access node, Transmission and Reception Point (TRP), base station or other general radio node allowing communication within a radio network. Network node 30 may also represent, for example, a base transceiver station, a base station controller, a network controller, an enhanced or evolved Node B (eNB), a Node B, a gNB (access point supporting NR or 5G), Multi-cell/Multicast Coordination Entity (MCE), a relay node, an access point, a radio access point, or a Remote Radio Unit (RRU) Remote Radio Head (RRH). The network node 30 provides wireless access to wireless devices (e.g., UEs) within a service or coverage area (e.g., cell) of the network node 30. The network node 30 described here is configured to operate in any one or more of the 3GPP cellular standards, GSM, GPRS, WCDMA, HSDPA, LTE, LTE-Advanced, 5G, NR, or any other networks or standards that utilize the techniques discussed herein. While the network node may be a base station serving a first service area, it could also be a control node, such as a Radio Network Controller (RNC).

As illustrated in FIG. 7, the network node 30 includes processing circuitry 32 comprising one or more processors 42 (e.g., Central Processing Units (CPUs), Application Specific Integrated Circuits (ASICs), Field Programmable Gate Arrays (FPGAs)) and a memory 44 that stores computer programs 46 and, optionally, configuration data 48. The network node 30 may include communication interface circuitry 38 to communicate with the core network or other network nodes. The network node 30 also includes radio equipment, which may include transceiver circuitry 36, which may include one or more transmitters and receivers coupled to one or more antennas 34, for communication with wireless devices, such as UEs like smartphones, tablets and laptops.

The transceiver circuit 36 may include transmitter circuits, receiver circuits, associated control circuits and/or PAs that are collectively configured to transmit and receive signals according to a radio access technology, for the purposes of providing cellular communication services. The transceiver circuit 36 may also comprise multiple transmitter or receiver chains.

In some embodiments, the functionality of the network node 30 described herein may be fully or partially implemented in software that is, for example, stored in the memory 44 and executed by the processor(s) 42. In some embodiments, the memory 44 of the network node 30 stores instructions that when executed by one or more of the processors 42 of the processing circuitry 32 configures the network node 30 to operate as a first network node serving a first service area in which a plurality of UEs are expected to enter. The first network node 30 in this case can be considered to be a target eNB. The processing circuitry 32 is configured to receive a message indicating that the plurality of UEs, requiring service from the wireless communications system, are expected to enter the first service area, the first service area being associated with the first network node. The processing circuitry is configured to determine, based on said message, that a change in power management for radio equipment 34, 36 corresponding to the first service area is required and determine a timing for initiating the change in power management for the radio equipment, taking into account a predicted time for when the plurality of UEs are expected to enter the first service area. The processing circuitry is also configured to trigger the change in power management for the radio equipment, based on the determined timing.

The network node 30 is also configured to perform a corresponding method 800. The method 800 includes receiving a message indicating that a plurality of UEs requiring service from the wireless communications system are expected to enter a first service area, the first service area being associated with the network node (block 802). The method 800 also includes determining, based on said message, that a change in power management for radio equipment corresponding to the first service area is required (block 804) and determining a timing for initiating the change in power management for the radio equipment, taking into account a predicted time for when the plurality of UEs are expected to enter the first service area (block 806). Determining the timing for initiating the change in power management may further take into account a predetermined estimate of a time required to make the change in power management. The method 800 further includes triggering the change in power management for the radio equipment, based on the determined timing (block 808).

Determining that the change in power management is required may include predicting a required capacity associated with the service area for a time interval beginning at the predicted time for when the plurality of UEs are expected to enter the service area, comparing the predicted, required capacity to a current capacity associated with the service area, and determining that the change in power management is required based on the comparing. Predicting the required capacity associated with the service area for the time interval beginning at the predicted time may take into account an expected departure for one or more UEs currently in the service area, the expected departure being before the predicted time.

The method 800 may include selecting the change in power management from a plurality of possible changes in power management, based on the magnitude of a difference between the predicted required capacity and the current capacity.

In some cases, the message is received from a second network node, the second network node being associated with a second service area neighboring the first service area.

The message may also include an estimated capacity associated with the plurality of UEs, where determining that the change in power management is required is based on the estimated capacity. The estimated capacity could simply be a number of UEs, or it could be some other metric. The base station may have advance information regarding a typical increase in capacity.

The message may include an indication of the predicted time for when the plurality of UEs are expected to enter the first service area. In other cases, this indication is not included in the message and thus the receiving base station predicts the time for when the plurality of UEs are expected to enter the first service area. The prediction may be based on an estimated speed of the plurality of UEs, an estimated distance from a predetermined point to a border of the first service area and/or a time at which the message is received or was transmitted.

The change in power management for the radio equipment associated with the first service area may include: a powering off or on of one more components of the radio equipment; a powering off or on of one more transmitter chains of a plurality of transmitter chains; and/or a change in operating point for one or more components of the radio equipment.

The method 800 may also include predicting a departure time from the first service area for a plurality of UEs and sending, to a third network node, prior to the predicted departure time, an indication that a plurality of UEs requiring service from the wireless communications system are expected to enter a third service area, the third service area being associated with the third network node.

In other embodiments, the network node 30 may be configured to operate as a first network node whose first service area a plurality of UEs is leaving. The first network node 30 may be a source eNB in this case. The processing circuitry 32 of the first network node 30 is configured to predict a departure time from the first service area for the plurality of UEs and send to a second network node, prior to the predicted departure time, an indication that a plurality of UEs requiring service from the wireless communications system are expected to enter a second service area. The second service area is associated with the second network node. This network node could be a base station serving the first service area, telling a neighboring base station that the UEs are coming. It could also be some more centralized node that is monitoring both the first and second service areas.

The network node 30 in this case is also configured to perform a method 900. The method 900 includes predicting a departure time from the first service area for a plurality of UEs (block 902) and sending to a second network node, prior to the predicted departure time, an indication that a plurality of UEs requiring service from the wireless communications system are expected to enter a second service area (block 904). The second service area being associated with the second network node.

The method 900 may include triggering a change in power management for radio equipment associated with the first network node, in response to the predicted departure time passing. The message may include an estimated capacity associated with the plurality of UEs and/or an indication of the predicted departure time. The predicted departure time may be calculated based on an estimated speed of the plurality of UEs and/or an estimated distance from a predetermined point to a border of the first service area.

In another embodiment, a network node is configured for dynamic selection of a power saving scheme. The network node provides coverage in a first service area or cell, which may be somewhere along a set path along which vehicles move. In some cases, the set path is a railway or highway. The network node is configured to perform a method that includes receiving a notification about incoming UEs and acquiring information on the capacity needed for the UEs approaching the first coverage area. The method includes predicting the point in time when the capacity for the group of UEs will be needed and determining that the needed capacity is different from the current capacity. The method further includes selecting a power saving scheme that caters for the needed capacity and applying the selected power saving scheme, thereby providing an optimum balance between power consumption and supported capacity in the cell.

Receiving a notification about incoming UEs may include receiving information from neighboring cell(s) and/or receiving information from a train operator (e.g., up-to-date time table). In some cases, acquiring information on the needed capacity includes receiving information from neighboring cell(s) on the cell load, and using such information to estimate the capacity needed in the target cell. In other cases, acquiring information on the needed capacity includes receiving information from a train operator on whether the train, for example, is a freight train or a passenger train.

Determining that the needed capacity is different from the current capacity includes comparing the capacity under the current power saving scheme (if any) with the capacity needed when the UEs enter the cell. If the needed capacity is larger than the current capacity, the method includes determining that the capacity, and hence the power saving scheme, has to be modified.

Selecting a power saving scheme may include comparing the needed capacity to the capacity provided under each power saving scheme and selecting a power saving scheme that provides at least the needed capacity. Applying the selected power saving scheme may include reconfiguring software and/or hardware and taking such reconfigurations into account when preparing mobility information for the incoming UEs. The mobility information may contain information on subframes that are not to be received by the UEs (signaled as MBSFN subframes).

In an embodiment, a network node is configured to act as a source network node that is providing coverage in a coverage area or cell that may be along a part of a set path along which vehicles move (e.g., railway, highway). The network node is configured to perform a method for dynamic selection of power saving scheme. The method includes determining that a group of UEs is approaching the coverage of a neighbor cell and indicating to a neighbor cell that the group of UEs is incoming. The method may include indicating what capacity is needed to serve the UEs. The method also includes determining that the capacity needed when the group of UEs has left the cell is different from the current capacity in the cell. The method further includes selecting a power saving scheme that caters to the capacity needed once the group of UEs has left the cell and applying the selected power saving scheme once the group of UEs has left the coverage of the cell.

Figure 10:
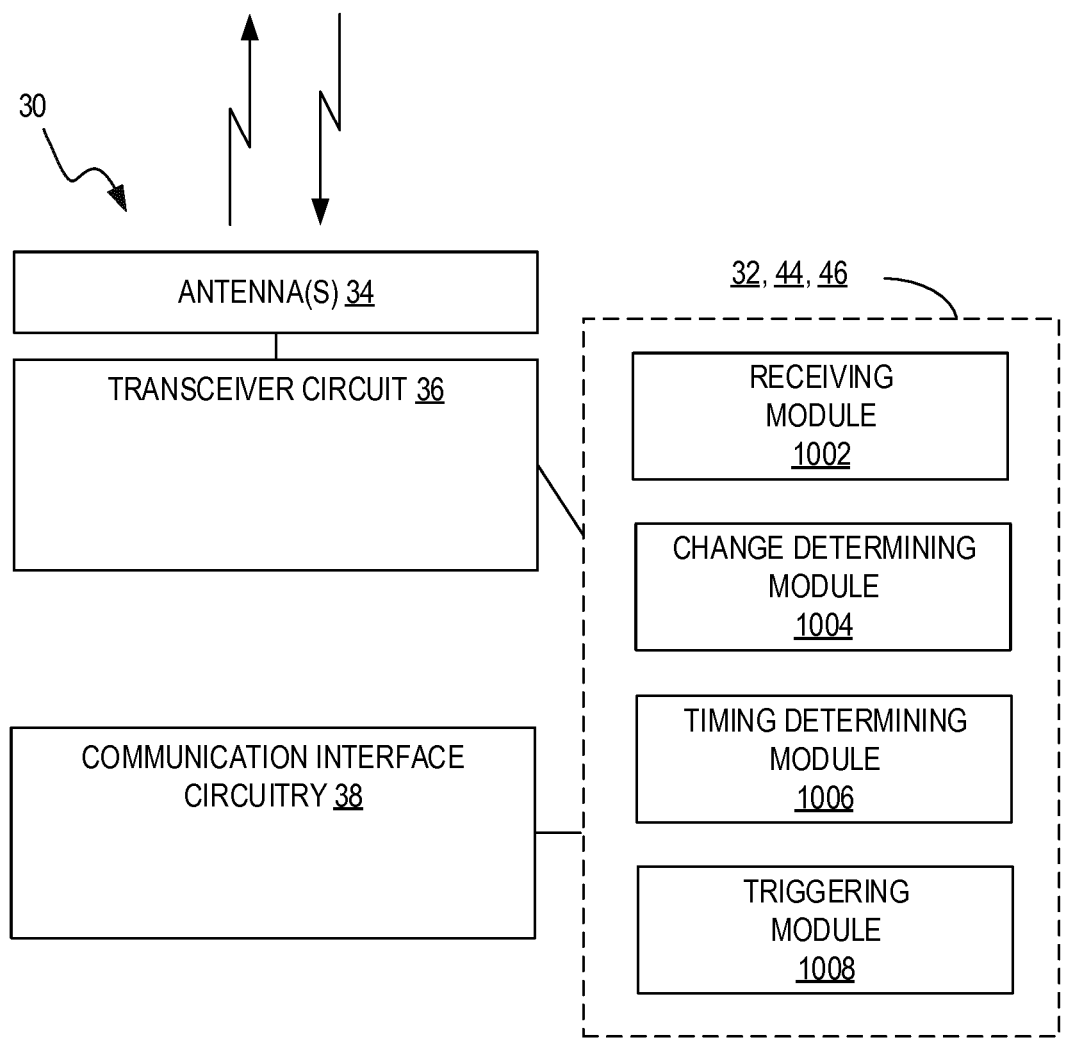
FIG. 10 is a block diagram illustrating a functional implementation of a network node, according to some embodiments.

FIG. 10 illustrates an example functional module or circuit architecture as may be implemented in a first network node 30. The implementation may include a receiving module 1002 for receiving a message indicating that a plurality of UEs require service from the wireless communications system are expected to enter a first service area, the first service area being associated with the network node. The implementation includes a change determining module 1004 for determining, based on said message, that a change in power management for radio equipment corresponding to the first service area is required. The implementation also includes a timing determining module 1006 for determining a timing for initiating the change in power management for the radio equipment, taking into account a predicted time for when the plurality of UEs are expected to enter the first service area, and a triggering module 1008 for triggering the change in power management for the radio equipment, based on the determined timing.

Figure 11:
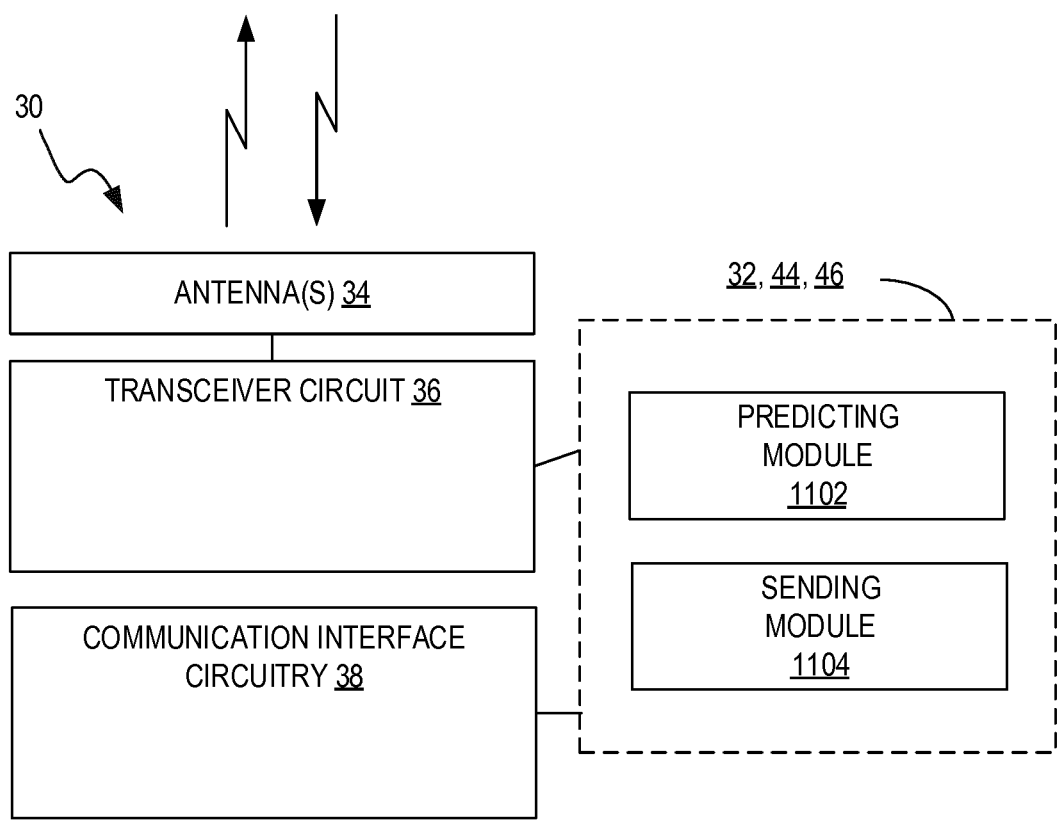
FIG. 11 is a block diagram illustrating another functional implementation of a network node, according to some embodiments.

FIG. 11 illustrates another example functional module or circuit architecture as may be implemented in a first network node 30 serving a first service area. The implementation includes a predicting module 1102 for predicting a departure time from the first service area for a plurality of UEs. The implementation also includes a sending module 1104 for sending to a second network node, prior to the predicted departure time, an indication that a plurality of UEs requiring service from the wireless communications system are expected to enter a second service area, the second service area being associated with the second network node.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a first network node of a wireless communications system, the method comprising:
 receiving a message indicating that a first plurality of user equipments (UEs) requiring service from the wireless communications system are expected to enter a first service area, the first service area being associated with the first network node;
 determining, based on the message, that a change in power management for radio equipment corresponding to the first service area is required;

determining a timing for initiating the change in power management for the radio equipment, taking into account a predicted time for when the first plurality of UEs are expected to enter the first service area; and triggering the change in power management for the radio equipment based on the determined timing.

2. The method of claim 1, wherein the determining the timing for initiating the change in power management takes into account a predetermined estimate of a time required to make the change in power management.

3. The method of claim 1, wherein the determining that the change in power management is required comprises:

predicting a required capacity associated with the first service area for a time interval beginning at the predicted time for when the first plurality of UEs are expected to enter the first service area;

comparing the predicted, required capacity to a current capacity associated with the first service area; and determining that the change in power management is required based on the comparing.

4. The method of claim 3, wherein the predicting the required capacity associated with the first service area for the time interval beginning at the predicted time comprises taking into account an expected departure for one or more UEs currently in the first service area, the expected departure being before the predicted time.

5. The method of claim 1, wherein the message is received from a second network node, the second network node being associated with a second service area neighboring the first service area.

6. The method of claim 1:

wherein the message includes an estimated capacity associated with the first plurality of UEs; and wherein the determining that the change in power management is required is based on the estimated capacity.

7. The method of claim 1, wherein the message includes an indication of the predicted time for when the first plurality of UEs are expected to enter the first service area.

8. The method of claim 1, wherein the first network node calculates the predicted time for when the first plurality of UEs are expected to enter the first service area based on:

an estimated speed of the first plurality of UEs;

an estimated distance from a predetermined point to a border of the first service area; and/or a time at which the message is received or was transmitted.

9. The method of claim 1, wherein the change in power management for the radio equipment associated with the first service area comprises:

a powering off or on of one more components of the radio equipment;

a powering off or on of one more transmitter chains of a first plurality of transmitter chains; and/or a change in operating point for one or more components of the radio equipment.

10. The method of claim 1, further comprising:

predicting a departure time from the first service area for a first plurality of UEs; and sending, to a third network node, prior to the predicted departure time, an indication that a first plurality of UEs requiring service from the wireless communications system are expected to enter a third service area, the third service area being associated with the third network node.

11. The method of claim 1, further comprising:

predicting a departure time from a first service area for a second plurality of user equipments (UEs); and sending to a second network node, prior to the predicted departure time, an indication that the second plurality of UEs requiring service from the wireless communications system are expected to enter a second service area, the second service area being associated with the second network node.

12. The method of claim 11, further comprising triggering a change in power management for radio equipment associated with the first network node in response to the predicted departure time passing.

13. The method of claim 11, wherein the message includes an estimated capacity associated with the second plurality of UEs.

14. The method of claim 11, wherein the message includes an indication of the predicted departure time.

15. The method of claim 11, wherein the first network node calculates the predicted departure time based on:

an estimated speed of the second plurality of UEs; and/or an estimated distance from a predetermined point to a border of the first service area.

16. A first network node of a wireless communications system, comprising:

communication circuitry configured for communicating with other network nodes;

radio equipment configured for communicating with user equipments (UEs) in a first service area of the first network node; and processing circuitry operatively associated with the communication circuitry and radio equipment and configured to:

receive a message indicating that a first plurality of UEs requiring service from the wireless communications system are expected to enter the first service area, the first service area being associated with the first network node;

determine, based on the message, that a change in power management for radio equipment corresponding to the first service area is required;

determine a timing for initiating the change in power management for the radio equipment, taking into account a predicted time for when the first plurality of UEs are expected to enter the first service area; and trigger the change in power management for the radio equipment, based on the determined timing.

17. The first network node of claim 16, wherein the processing circuitry is configured to determine the timing for initiating the change in power management by taking into account a predetermined estimate of a time required to make the change in power management.

18. The first network node of claim 16, wherein the processing circuitry is configured to determine that the change in power management is required by:

predicting a required capacity associated with the first service area for a time interval beginning at the predicted time for when the first plurality of UEs are expected to enter the first service area;

comparing the predicted, required capacity to a current capacity associated with the first service area; and determining that the change in power management is required based on the comparing.

19. The first network node of claim 18, wherein the processing circuitry is configured to predict the required capacity associated with the first service area for the time interval beginning at the predicted time by taking into account an expected departure for one or more UEs currently in the first service area, the expected departure being before the predicted time.

20. The first network node of claim 16, wherein the processing circuitry is further configured to:
   predict a departure time from the first service area for a second plurality of user equipments (UEs); and
   send to a second network node, prior to the predicted departure time, an indication that the second plurality of UEs requiring service from the wireless communications system are expected to enter a second service area, the second service area being associated with the second network node.

21. A non-transitory computer readable storage medium storing a computer program for controlling a first network node of a wireless communications system, the computer program product comprising program instructions that, when run on processing circuitry of the first network node, causes the first network node to:
   receive a message indicating that a first plurality of user equipments (UEs) requiring service from the wireless communications system are expected to enter a first service area, the first service area being associated with the first network node;
   determine, based on the message, that a change in power management for radio equipment corresponding to the first service area is required;
   determine a timing for initiating the change in power management for the radio equipment, taking into account a predicted time for when the first plurality of UEs are expected to enter the first service area; and
   trigger the change in power management for the radio equipment, based on the determined timing.

22. The non-transitory computer readable storage medium according to claim 21 further comprising program instructions that, when run on the processing circuitry of the first network node, causes the first network node to:
   predict a departure time from the first service area for a second plurality of user equipments (UEs); and
   send to a second network node, prior to the predicted departure time, an indication that the second plurality of UEs requiring service from the wireless communications system are expected to enter a second service area, the second service area being associated with the second network node.

* * * * *